United States Patent
Zhou

(10) Patent No.: US 9,500,123 B2
(45) Date of Patent: Nov. 22, 2016

(54) METHOD FOR IMPROVING FUEL EFFICIENCY OF VEHICLE AND EXCLUSIVE ENERGY SAVING AND EMISSION REDUCTION DEVICE THEREOF

(71) Applicant: Weibo Zhou, Hunan (CN)

(72) Inventor: Weibo Zhou, Hunan (CN)

(*) Notice: Subject to any disclaimer, the term of this patent is extended or adjusted under 35 U.S.C. 154(b) by 147 days.

(21) Appl. No.: 14/394,832

(22) PCT Filed: Apr. 17, 2013

(86) PCT No.: PCT/CN2013/074308
§ 371 (c)(1),
(2) Date: Oct. 16, 2014

(87) PCT Pub. No.: WO2013/155965
PCT Pub. Date: Oct. 24, 2013

(65) Prior Publication Data
US 2015/0059316 A1    Mar. 5, 2015

(30) Foreign Application Priority Data

Apr. 18, 2012 (CN) .......................... 2012 1 0114749
Jan. 28, 2013 (CN) .......................... 2013 1 0031533
Jan. 28, 2013 (CN) .......................... 2013 2 0044901

(51) Int. Cl.
| | |
|---|---|
| *F01M 11/08* | (2006.01) |
| *F02B 43/04* | (2006.01) |
| *F01M 13/02* | (2006.01) |
| *F01M 13/04* | (2006.01) |
| *F01M 11/03* | (2006.01) |
| *B01D 45/08* | (2006.01) |
| *B01D 45/16* | (2006.01) |
| *B01D 50/00* | (2006.01) |

(52) U.S. Cl.
CPC ............ *F02B 43/04* (2013.01); *F01M 13/022* (2013.01); *F01M 13/04* (2013.01); *F02M 26/34* (2016.02); *F02M 26/35* (2016.02); *B01D 45/08* (2013.01); *B01D 45/16* (2013.01); *B01D 50/002* (2013.01); *F01M 2011/038* (2013.01); *F01M 2013/0422* (2013.01); *F01M 2013/0427* (2013.01); *F01M 2013/0433* (2013.01); *F01M 2013/0438* (2013.01); *F01M 2013/0461* (2013.01)

(58) Field of Classification Search
CPC ........... F01M 11/08; F01M 2011/038; F01M 2013/045; F01M 2013/0422; F01M 2013/0427; F02M 26/34; F02M 26/35
See application file for complete search history.

(56) References Cited

U.S. PATENT DOCUMENTS

| | | | | |
|---|---|---|---|---|
| 4,329,968 | A * | 5/1982 | Ishikawa | F01M 13/04 123/192.1 |
| 5,944,001 | A * | 8/1999 | Hutchins | B01D 45/16 123/572 |
| 2010/0300413 | A1 * | 12/2010 | Ulrey | F02D 9/12 123/518 |

FOREIGN PATENT DOCUMENTS

CN           201738984           * 2/2011

*Primary Examiner* — Erick Solis

(57) ABSTRACT

A method for improving fuel efficiency of a vehicle and an exclusive energy saving and emission reduction device thereof are provided. The key points of the technical solutions are as follows. An exhaust separation device is installed in a crankcase of an engine. An oil-gas separation technology is adopted to manufacture an oil-gas separator and a diffusion vortex chamber. According to an aerodynamic principle, the separation degree of the exhaust is improved through compression and high speed vortex in the energy saving device, in such a manner that engine oil vapor in the exhaust is separated from combustible mixed gases, and then sent to the engine via an air intake throttle. The present invention enables complete combustion of the fuel, so as to achieve effects of oil-saving and emission-reducing.

29 Claims, 12 Drawing Sheets

METHOD FOR IMPROVING FUEL EFFICIENCY OF VEHICLE AND EXCLUSIVE ENERGY SAVING AND EMISSION REDUCTION DEVICE THEREOF

CROSS REFERENCE OF RELATED APPLICATION

This is a U.S. National Stage under 35 U.S.C. 371 of the International Application PCT/CN2013/074308, filed Apr. 17, 2013, which claims priority under 35 U.S.C. 119(a-d) to CN 201210114749.X, filed Apr. 18, 2012; CN 201320044901.1, filed Jan. 28, 2013; and CN 201310031533.1, filed Jan. 28, 2013.

BACKGROUND OF THE PRESENT INVENTION

Field of Invention

The present invention relates to an oil-gas separation method for vehicle combustion gases, and more particularly to a method for improving fuel efficiency of a vehicle and an exclusive oil-gas separation device thereof.

Description of Related Arts

Currently, automobiles have been possessed by more and more customers and have evolved from the original luxuries into ordinary means of transportation. How to reduce fuel consumption, save energy sources, reduce automobile emissions, and protect the engine have received the socially widespread concern from all walks of life. Currently, an endless variety of fuel-saving technologies has emerged in the automotive industry. Measures such as electronic throttle control, brake control and etc. are mainly taken to improve fuel efficiency. Though the fuel-saving technologies have apparent effects, fuels in the conventional engines are not performed with complete combustion, and 20%-30% of the fuel is discharged as waste gas by the engine. The low utilization ratio of the fuels remains to be improved, which has disadvantages in reducing carbon deposits, and easily causes damages on the engine of the automotives. In the conventional automotives, gas enters the engine via an air intake throttle, wherein a first part of the post-combustion exhaust in the engine is discharged via the exhaust pipe, and a second part thereof is directly transmitted to the air intake throttle via a flue gas leading to enter the engine again for combustion. Since the exhaust contains substances like oil causing damages on the engine, the combustion efficiency of the engine is reduced and carbon deposits are easily generated, so that the efficiency and service life of the engine is reduced.

SUMMARY OF THE PRESENT INVENTION

An object of the present invention is to provide a method capable of collecting oil in the engine and cleaning oil vapor to return back to the engine for recycling, so as to improve a fuel efficiency of a vehicle. Another object of the present invention is to provide an exclusive energy saving and emission reduction device for improving a fuel efficiency of a vehicle.

Accordingly, in order to solve the technical problems mentioned above, the present invention provides technical solutions as follows. A method for improving a fuel efficiency of a vehicle, comprises steps of:

installing an energy saving device 20 for separating exhaust between an engine 21 and an air intake throttle 22; and according to an aerodynamic principle, compressing the exhaust and performing high speed vortex on the exhaust in the energy saving device 20 to improve separation degree, so as to separate engine oil vapor in the exhaust from combustible mixed gases for sending into the engine 21 via the air intake throttle 22.

Preferably, the energy saving device 20 is a sealed body manufactured by an oil-gas separating technology and comprising a diffusion vortex chamber and an oil-gas separator. The energy saving device 20 is specifically embodied as a cylinder structure formed by a longitudinally arranged diffusion vortex chamber and a longitudinally arranged oil-gas separator; or a box structure formed by a horizontally arranged diffusion vortex chamber and a horizontally arranged oil-gas separator; or a combined structure formed by the horizontally arranged diffusion vortex chamber and the longitudinally arranged oil-gas separator.

The energy saving device 20 is mainly embodied as a cylindrical structure manufactured by an oil-gas separating technology and having a diffusion vortex chamber and a separating tube provided, wherein according to an aerodynamic principle, the exhaust is compressed and performed with high speed vortex in the energy saving device 20 to improve separation degree, so as to separate engine oil vapor in the exhaust from the combustible mixed gases for sending into the engine 21 via the air intake throttle 22.

A first exclusive energy saving and emission reduction device for the method for improving fuel efficiency of the vehicle provided by the present invention is a first cylinder structure formed by a longitudinally arranged diffusion vortex chamber and a longitudinally arranged oil-gas separator, wherein the energy saving device 20 comprises an external shell 1, an air inlet pipe 10 and an air outlet pipe 11;

wherein the external shell 1 is a sealed cylinder shaped shell, the air inlet pipe 10 and the air outlet pipe 11 are provided on an up portion of the external shell 1;

wherein a first upper baffle 3 and a first lower baffle 5 are mounted in the external shell 1, the first upper baffle 3 and the first lower baffle 5 divide an internal chamber of the external shell 1 into an upper chamber 2, a middle chamber 4 and a lower chamber 7; wherein the air inlet pipe 10 is hermetically matched with and respectively passes through a shell top plate 9, the first upper baffle 3 and the first lower baffle 5 to extend into the lower chamber 7, and an inlet-pipe bend 6 is provided on an end portion of the air inlet pipe 10;

wherein the air outlet pipe 11 is hermetically matched with and passes through the shell top plate 9 to communicate with the upper chamber 2;

wherein two tubes are provided in the middle chamber 4 which are respectively a primary separation tube 14 and a secondary separation tube 13, an upper portion of the primary separation tube 14 has a primary-separation-tube discharge hole 12 provided thereon, a lower portion of the primary separation tube 14 is communicated with the lower chamber 7, a lower portion of the secondary separation tube 13 has a secondary-separation-tube inlet hole 15, and an upper portion of the secondary separation tube 13 is communicated with the upper chamber 2.

Preferably, the external shell 1 is in a cylinder shape, a shell-bottom plate 8 is concave downward and has an arc surface, a center of a bottom of the arc surface has a bottom-plate oil leaking hole 18, a bottom-plate oil drain pipe 19 is provided below the bottom-plate oil leaking hole 18.

Preferably, the first lower baffle 5 is concave downward and has an arc surface, a center of a bottom of the arc surface has a lower-baffle oil leaking hole 16, a lower-baffle oil leaking pipe 17 is provided below the lower-baffle oil leaking hole 16.

Preferably, the shell top plate 9 is convex upward and has an arc surface.

Preferably, the inlet-pipe bend 6 is bending outwardly at an angle of 90°, and an end portion of the inlet-pipe bend 6 has an inclined cutting.

Preferably, the inclined cutting on the end portion of the inlet-pipe bend 6 faces slightly downward.

Preferably, at least 3 separation-tube interlayers are sleeved in the separation tube, and each separation-tube interlayer has at least 3 through holes provided thereon.

Preferably, the through holes provided on the separation-tube interlayer are in a shape of a square, a rhombus, a circle or a curve.

Preferably, the through holes provided on the separation-tube interlayer are arranged irregularly.

A second exclusive energy saving and emission reduction device for the method for improving fuel efficiency of the vehicle provided by the present invention is a second cylinder structure formed by a longitudinally arranged diffusion vortex chamber and a longitudinally arranged oil-gas separator, wherein the energy saving device 20 comprises a second cylinder 37, an air inlet pipe 10 and an air outlet joint 44;

wherein both ends of the second cylinder 37 are sealed, a second lower baffle 40 is hermetically provided on a middle portion inside the second cylinder 37, so as to separate the second cylinder 37 into a vortex chamber on a lower portion and a filter chamber on an upper portion;

wherein an air inlet hole is provided on the second cylinder 37 below the second lower baffle 40 for hermetically installing the air inlet pipe 10, through holes for communicating with the vortex chamber on the lower portion and the filter chamber on the upper portion are provided on the lower baffle 40; and wherein a filter module 38 is hermetically provided in the filter chamber on the upper portion above the second lower baffle 40 in the second cylinder 37, air through holes are respectively provided on an upper end and a lower end of the filter module 38, a lower air through hole of the filter module 38 matches the through hole provided on the second lower baffle 40, the upper air through hole of the filter module 38 communicates with the filter chamber, an exhaust through hole is provided on an up portion or an external wall of the filter chamber to install an air outlet joint 44.

Preferably, the second cylinder 37 is in a cylinder shape; a head cover 43 and a bottom cover 41 are respectively hermetically provided on two ends of the second cylinder 37; and a bottom cover oil drain pipe joint 42 is provided on the bottom cover 41.

Preferably, a second upper baffle 39 is hermetically provided above the filter module 38 in the filter chamber, so as to form an exhaust chamber; a through hole for communicating the exhaust chamber and the filter chamber is provided on the second upper baffle 39, an exhaust through hole is provided on an up portion or an external wall of the exhaust chamber to install an air outlet joint 44. Preferably, the bottom cover 41 is an outwardly convex structure, and a bottom-cover oil leaking hole 45 and a correspondent bottom-cover oil drain pipe joint 42 are provided on a bottom of the bottom cover 41.

Preferably, the filter module 38 is in a shape of a cuboid or a cylinder, and comprises a second filter shell 46 and a second filter screen 47, wherein the second filter shell 46 is in a shape of a cuboid or a cylinder, and the second filter screen 47 is provided inside the second filter shell 46, and wherein the second filter screen 47 comprises at least 3 layers having irregular arranged through holes and baffles arranged in parallel.

Preferably, the second filter screen 47 is folded on an entire screen to form into at least 3 baffles arranged in parallel, and each baffle has at least 3 through holes arranged irregularly.

Preferably, a filter-module cover plate 48 matching with the second filter shell 46 is provided on any longitudinal side of the second filter shell 46, wherein the filter-module cover plate 48 is in a square shape or a circular shape.

Preferably, the second upper baffle 39 has a round hole close to a periphery thereof, the second lower baffle 40 is a downward concave structure having an arc surface, and a center of the arc surface has a round hole.

Preferably, a middle portion of the air inlet pipe 10 is bended, an opening of the air inlet pipe 10 entering the second cylinder 37 has an inclined cutting which is over 10°, the inclined cutting faces a wall of the second cylinder 37 slightly downwardly.

A third exclusive energy saving and emission reduction device for improving fuel efficiency of the vehicle provided by the present invention is a combined structure formed by the horizontally arranged diffusion vortex chamber and the longitudinally arranged oil-gas separator, wherein the energy saving device 20 comprises an external shell, a heavy oil dirt separator 36 and a light oil dirt filter 24, wherein the heavy oil dirt separator 36 and the light oil dirt filter 24 are respectively provided on two sides of a chamber of the external shell, and an intermediate connection tube 23 is provided between the heavy oil dirt separator 36 and the light oil dirt filter 24;

through holes respectively matching with an air inlet pipe 10 and an air outlet pipe 11 are provided on two ends of the external shell, and a drain hole is provided on a low portion of the external shell;

a first end of the air inlet pipe 10 hermetically passes through the through hole of the external shell to be inclinedly inserted into the heavy oil dirt separator 36, and is closely adhered to an internal wall of the heavy oil dirt separator 36;

a drain outlet and a drain pipe matching with the drain outlet are provided on a bottom of the heavy oil dirt separator 36, the drain pipe passes through the drain hole provided on the low portion of the external shell and extends out of the external shell;

an air outlet connector is provided on an up portion of the heavy oil dirt separator 36, wherein the air inlet connector is connected with a first end of the intermediate connection tube 23, and a second end of the intermediate connection tube 23 is connected with an air inlet connector on a first end of the light oil dirt filter 24; and an air hole communicated with the chamber in the external shell is provided on a second end of the light oil dirt filter 24, and the air outlet pipe 11 is communicated with the chamber in the external shell.

Preferably, a height of a first side of the external shell having the heavy oil dirt separator 36 provided is greater than a second side thereof having the light oil dirt filter 24 provided, and an installation height of the light oil dirt filter 24 is greater than a height of a bottom of the heavy oil dirt separator 36.

Preferably, a baffle 25 is provided on an up portion of the light oil dirt filter 24, a folder block is provided on a first end of the baffle 25, the folder block has a through hole provided, contact portions between the baffle 25, the folder block and the chamber of the external shell are hermetically matched, in such a manner that an exhaust chamber is divided from the chamber of the external shell, and the air outlet pipe 11 is provided on a side of the exhaust chamber and communicated with the exhaust chamber.

Preferably, the external shell is formed by an upper shell 32 and a lower shell 33 which are hermetically matched, wherein the drain pipe provided on the bottom of the heavy oil dirt separator 36 passes through the drain hole provided on the low portion of the lower shell 33 and extends out of the lower shell 33.

Preferably, the heavy oil dirt separator 36 comprises an upper cover 26, a first cylinder 27 and a lower cover 28;

wherein the upper cover 26 is matched with and provided on an upper end of the first cylinder 27; a through hole matched with the air inlet pipe 10 is provided on an up portion of a wall of the first cylinder 27, the lower cover 28 is provided on a lower end of the first cylinder 27, wherein the lower cover 28 is an outwardly convex structure, a lower-cover oil leaking hole 34 is provided on a bottom of the lower cover 28, and a lower-cover oil drain pipe 35 matched with the lower-cover oil leaking hole 34 is provided below the lower-cover oil leaking hole 34.

Preferably, the lower cover 28 is in a shape of a dish comprising at least one boss, the lower cover 28 has a through hole matched with the drain hole provided on the low portion of the external shell, or an oil hole communicated with the chamber of the external shell is provided on a low portion of the lower cover 28.

Preferably, the light oil dirt filter 24 comprises a first filter shell 29 and a first filter screen 30;

wherein a periphery of the first filter screen 30 is hermetically matched with an internal wall of the first filter shell 29, an air inlet connector is provided on a first side of the first filter shell 29, an air hole communicated with the chamber of the external shell is provided on a second side of the first filter shell 29;

wherein the first filter screen 30 is folded on an entire screen to form into at least 3 baffles arranged in parallel or in a staggered form, and each baffle has at least 3 through holes arranged irregularly, Alternatively, the first filter screen 30 is formed by at least 3 layers of baffles having irregularly arranged through holes.

Preferably, a cover plate 31 matched with the first filter shell 29 is provided on any longitudinal side of the first filter shell 29, wherein the cover plate 31 is in a circular or square shape.

Preferably, at least 6 bumps are provided on the upper shell 32; and a pipe opening on an end portion of the air inlet pipe 10 on which the air inlet pipe 10 is connected with the first cylinder 27 of the heavy oil dirt separator 36 is an inclined cutting having an angle of over 10°.

Beneficial effects of the present invention are as follows. An exhaust separation device is installed between the engine and the air intake throttle, wherein an oil-gas separation technology is adopted to manufacture an oil-gas separator having a diffusion vortex chamber. According to an aerodynamic principle, the separation degree of the exhaust is improved through compression and high speed vortex in the energy saving device, in such a manner that engine oil vapor in the exhaust is separated from combustible mixed gases, and then sent to the engine via the air intake throttle. The present invention enables the fuel to be fully burned so as to achieve effects of saving oil, absorbing harmful gases and reducing emissions. Under normal circumstances, the present invention is capable of reducing fuel consumption by more than 10% to 20% and reducing automobile emission by 10% to 40%, and therefore is suitable for being utilized widely in various fuel-burning vehicle engines.

These and other objectives, features, and advantages of the present invention will become apparent from the following detailed description, the accompanying drawings, and the appended claims.

Reference numbers in the Figs: 1—external shell; 2—upper chamber; 3—first upper baffle; 4—middle chamber; 5—second lower baffle; 6—inlet pipe bend; 7—lower chamber; 8—shell bottom plate; 9—shell top plate; 10—air inlet pipe; 11—air outlet pipe; 12—primary separation tube discharge hole; 13—secondary separation tube; 14—primary separation tube; 15—secondary-separation-tube inlet hole; 16—lower-baffle oil leaking hole; 17—lower-baffle oil leaking pipe; 18—bottom-plate oil leaking hole; 19—bottom-plate oil drain pipe; 20—energy-saving device; 21—engine; 22—air intake throttle; 23—intermediate connection tube; 24—light oil dirt filter; 25—baffle; 26—upper cover; 27—first cylinder; 28—lower cover; 29—first filter shell; 30—first filter screen; 31—cover plate; 32—upper shell; 33—lower shell; 34—lower-cover oil leaking hole; 35—lower-cover oil drain pipe; 36—heavy oil dirt separator; 37—second cylinder; 38—filtering module; 39—second upper baffle; 40—second lower baffle; 41—bottom cover; 42—bottom-cover oil drain pipe joint; 43—head cover; 44—air outlet joint; 45—bottom-cover oil leaking hole; 46—second filter shell; 47—second filter screen; 48—filtering-module cover plate.

DETAILED DESCRIPTION OF THE PREFERRED EMBODIMENT

Further description of the present invention is illustrated combining with the accompanying drawings and the preferred embodiments.

Embodiment 1

Figure 1:
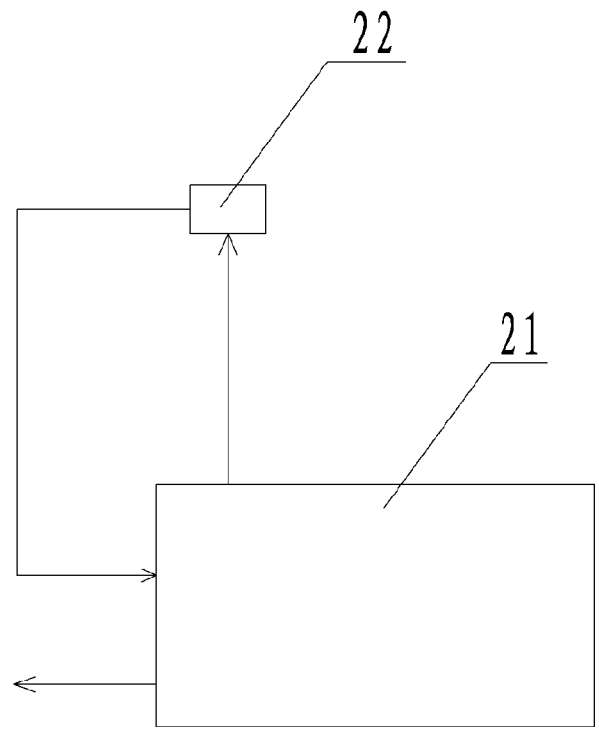
FIG. 1 is a diagram showing working principles of a conventional engine.
Figure 2:
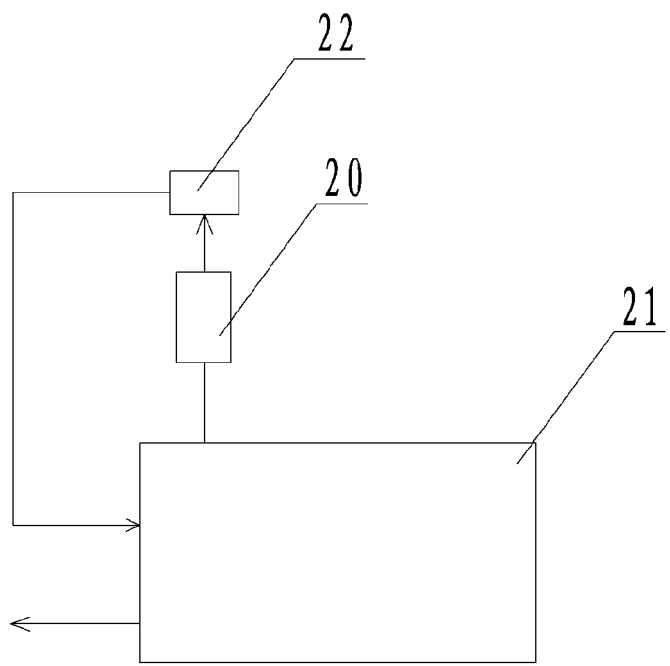
FIG. 2 is a diagram showing working principles of the present invention.
Figure 3:
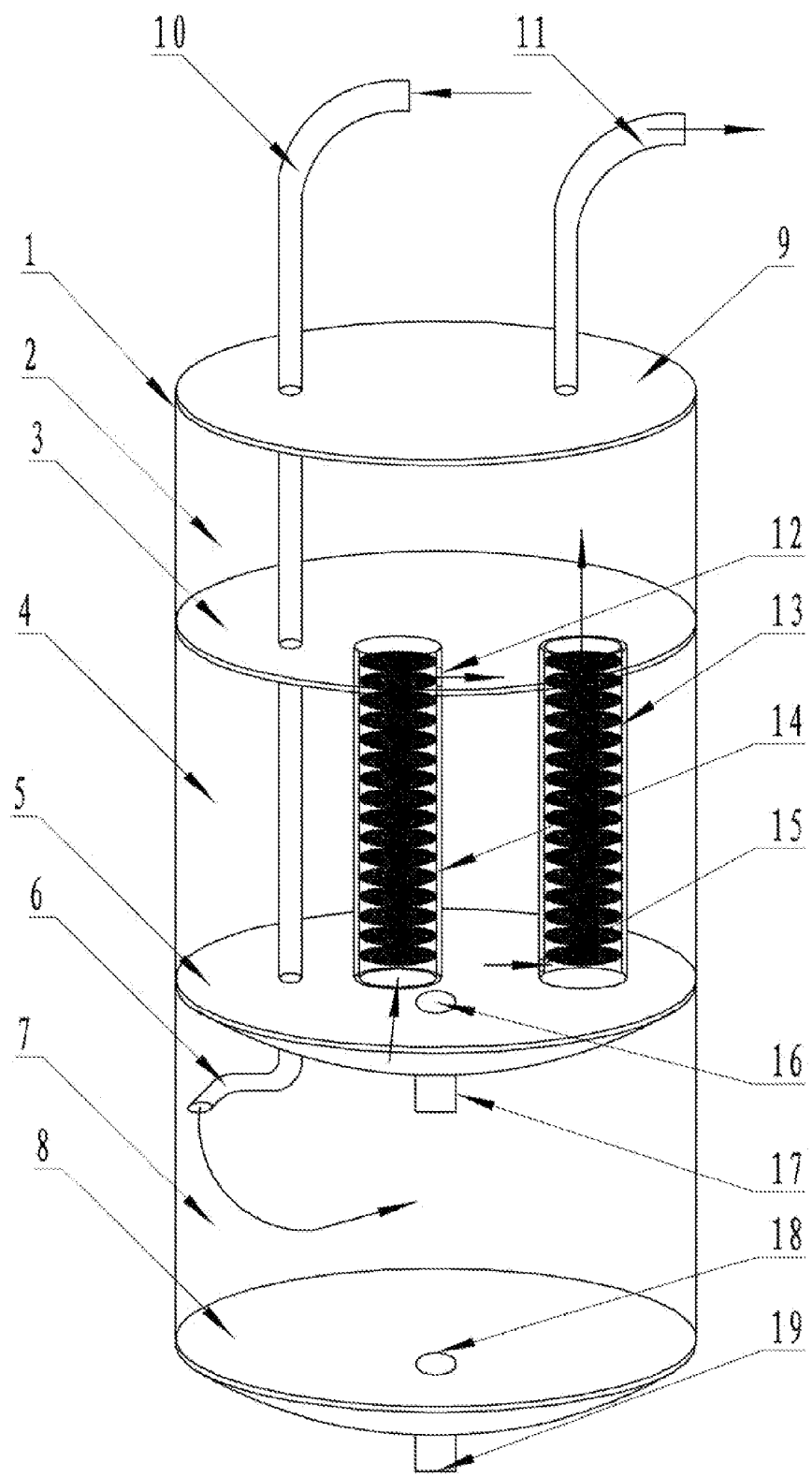
FIG. 3 is a sketch view of a diffusion vortex chamber and a longitudinal installed tube-structure energy saving device adopted by an oil-gas separator.
Figure 4:
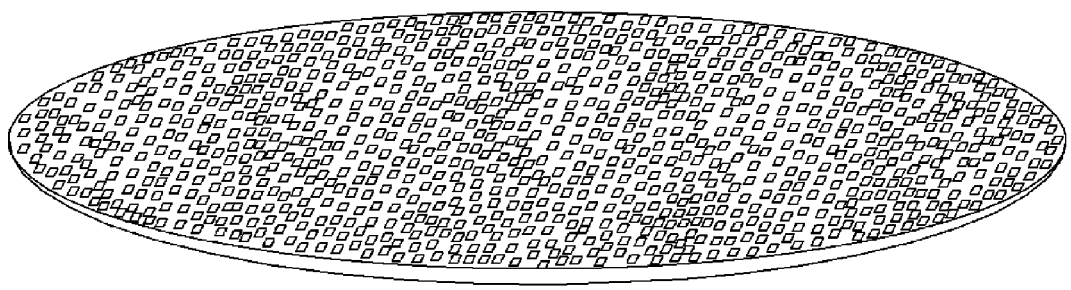
FIG. 4 is a structural sketch view of a shape of an interlayer of a separating tube of FIG. 3.
Figure 5:
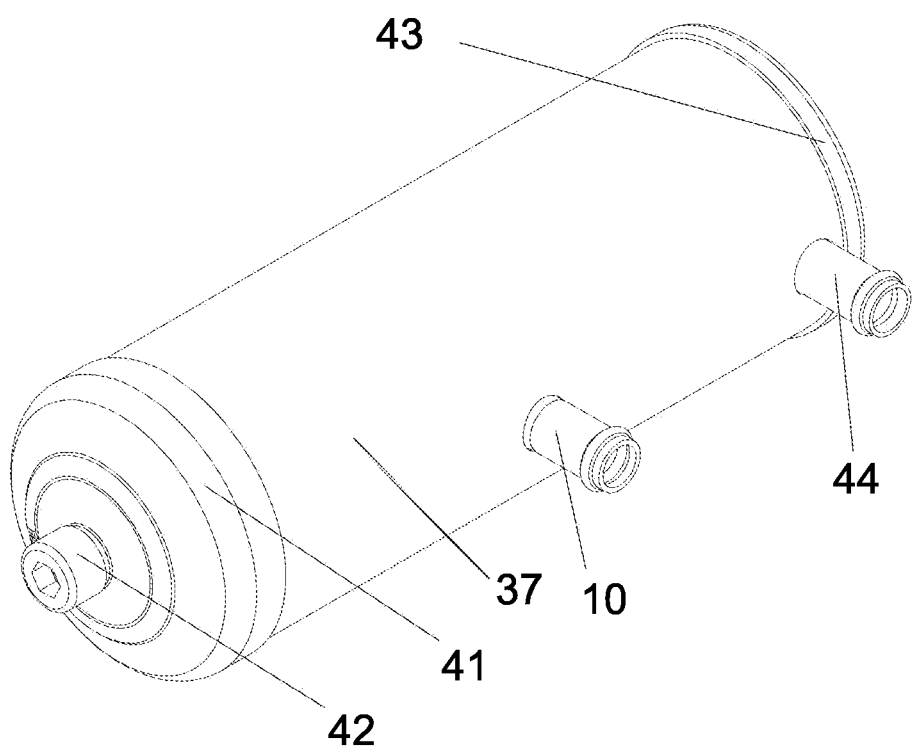
FIG. 5 is a perspective view of the diffusion vortex chamber and a horizontal installed tube-structure energy saving device adopted by an oil-gas separator.
Figure 6:
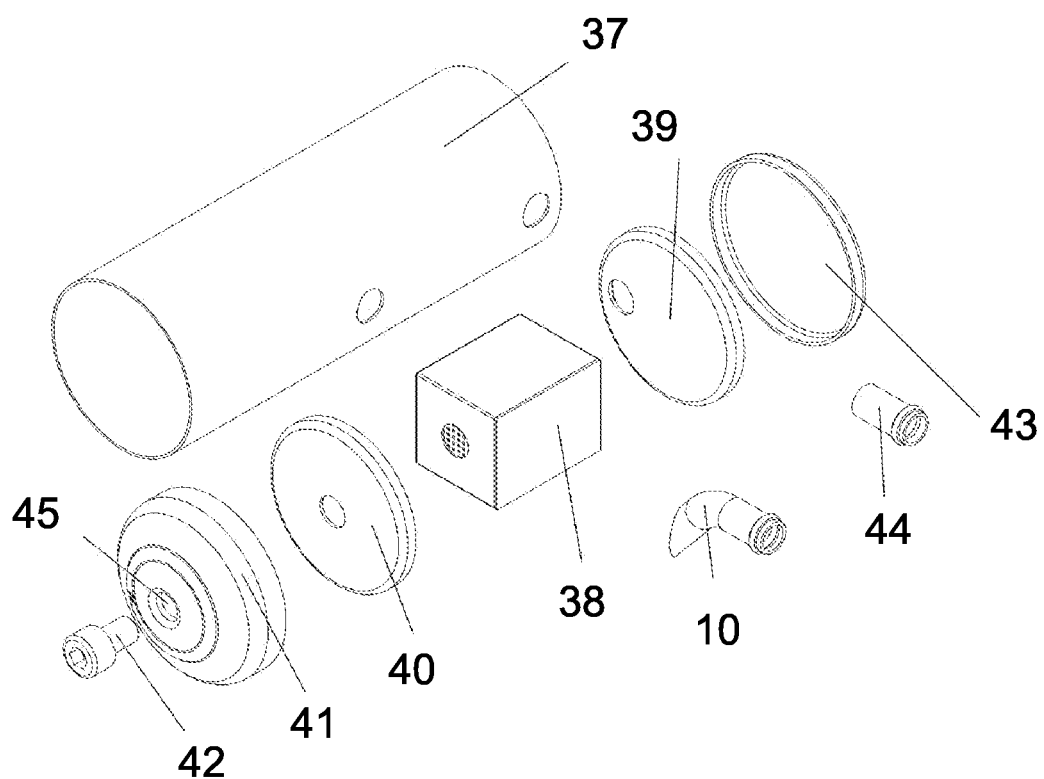
FIG. 6 is an exploded view of FIG. 5.
Figure 7:
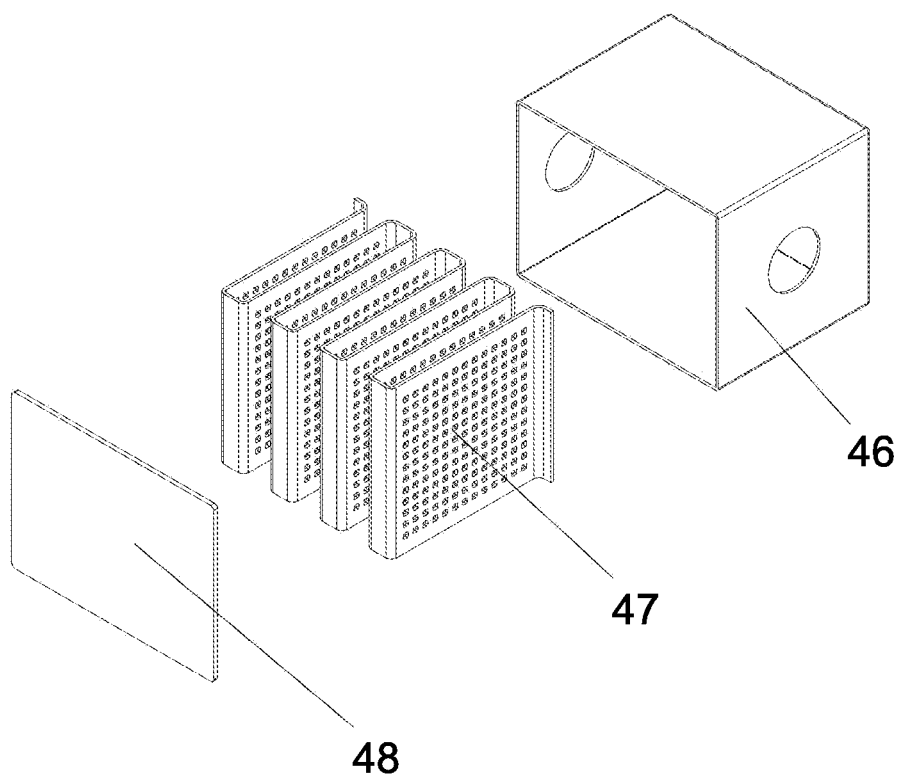
FIG. 7 is an exploded view of a heavy oil dirt separator of FIG. 5.
Figure 8:
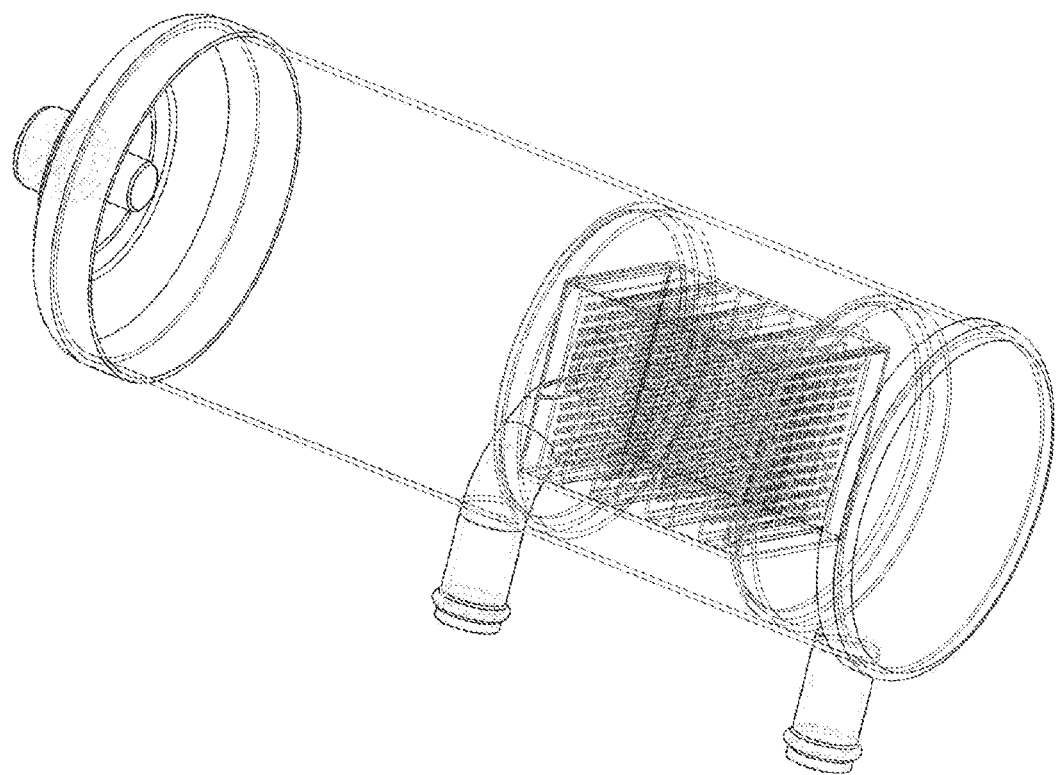
FIG. 8 is an exploded view of a light oil dirt filter of FIG. 5.
Figure 9:
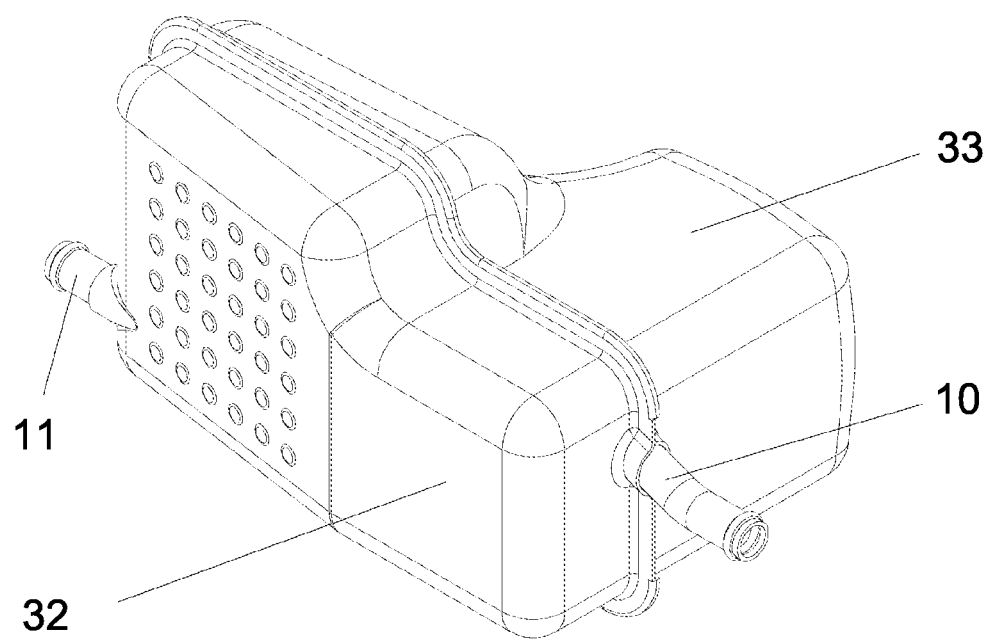
FIG. 9 is a cross-sectional view of FIG. 5.
Figure 10:
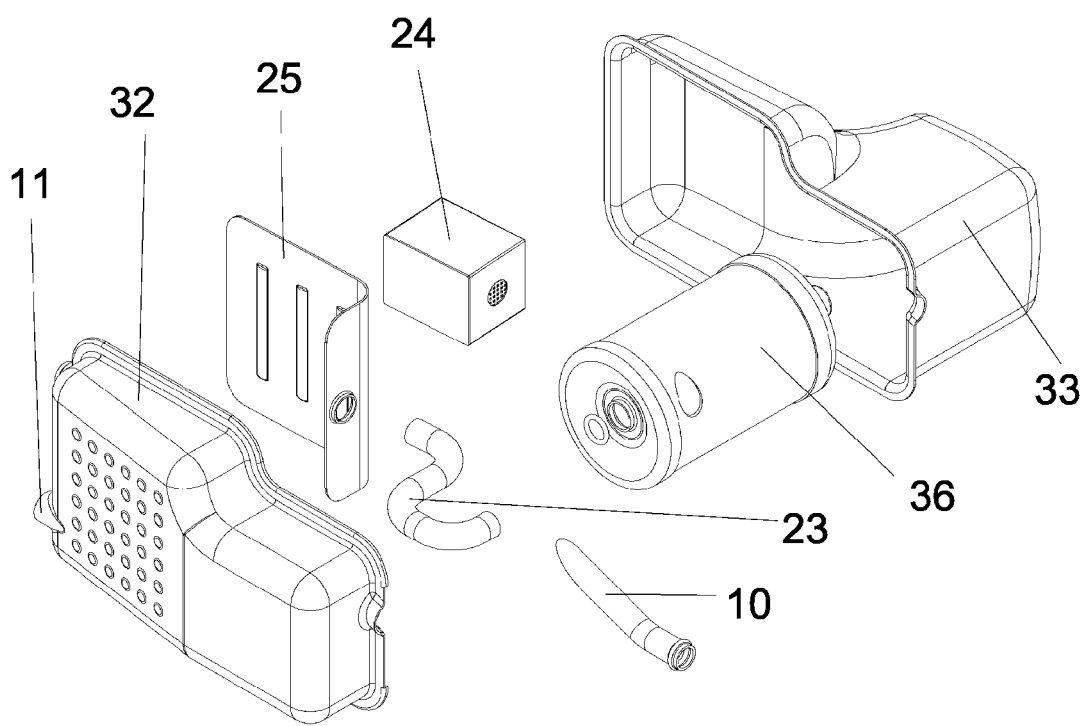
FIG. 10 is a perspective view of an energy saving device comprising a horizontal installed diffusion vortex chamber and a longitudinal installed oil-gas separator.
Figure 11:
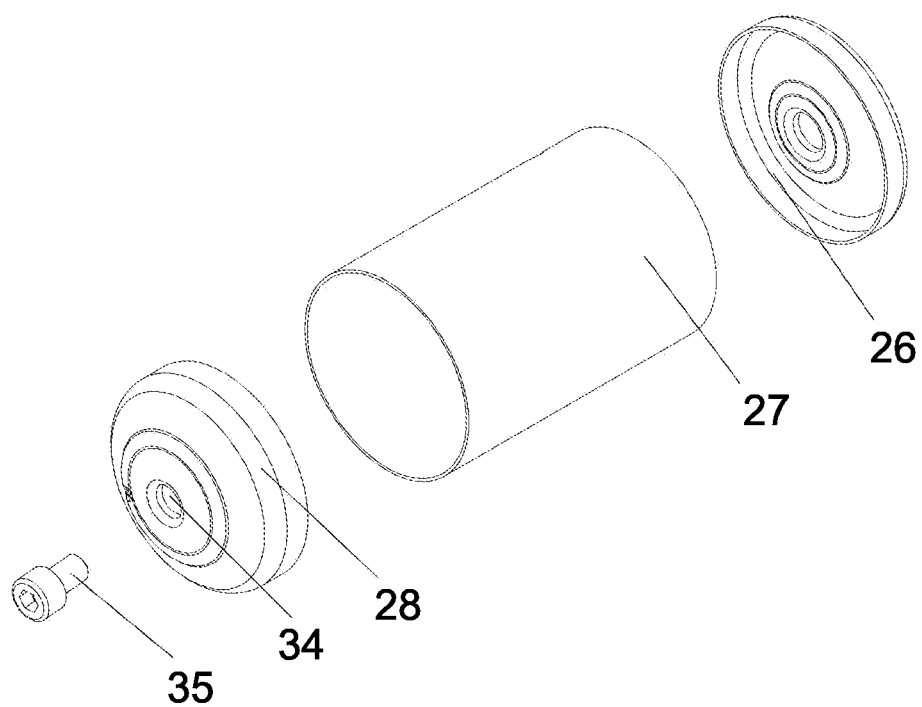
FIG. 11 is an exploded view of FIG. 10.
Figure 12:
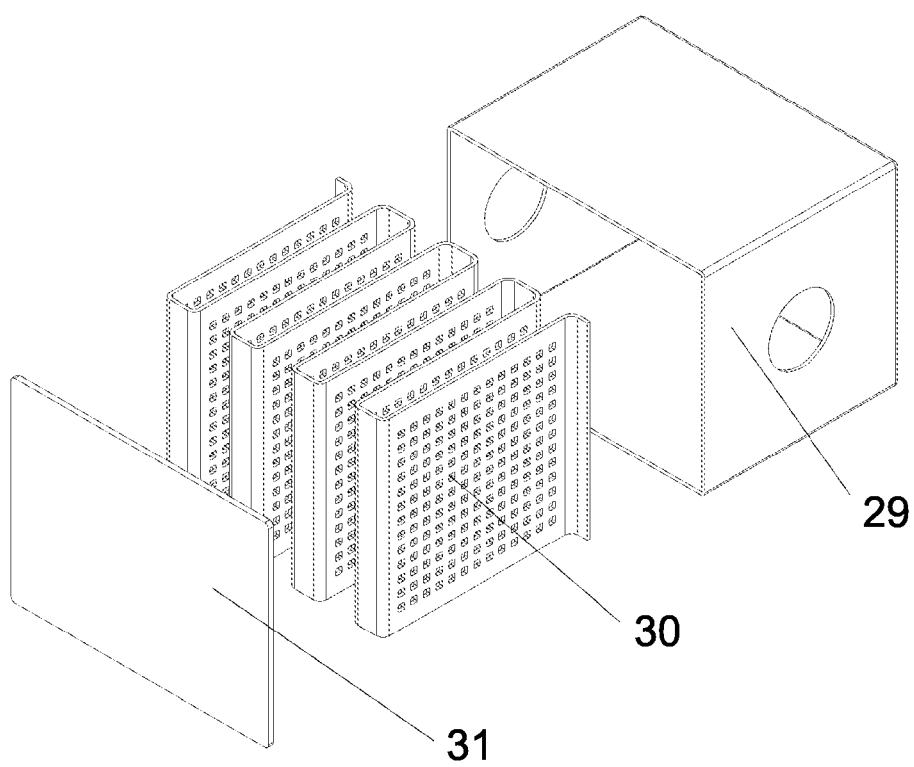
FIG. 12 is an exploded view of a filtering module of FIG. 10.
Figure 13:
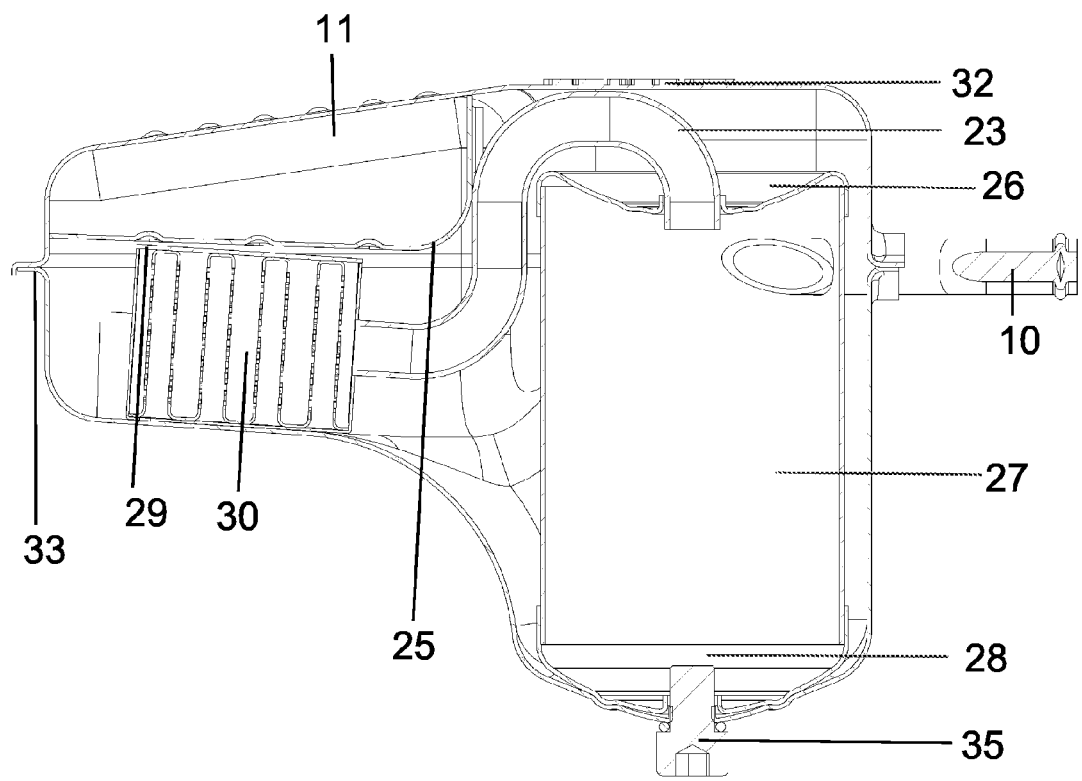
FIG. 13 is an overall structural sketch view of FIG. 10.

Referring to FIGS. 1-13, a method for improving fuel efficiency of a vehicle, comprises steps of:

installing an energy saving device 20 for separating exhaust between an engine 21 and an air intake throttle 22; and according to an aerodynamic principle, compressing the exhaust and performing high speed vortex on the exhaust in the energy saving device 20 to improve separation degree, so as to separate engine oil vapor in the exhaust from combustible mixed gases for sending into the engine 21 via the air intake throttle 22.

Embodiment 2

The energy saving device 20 is specifically embodied as a cylinder structure formed by a longitudinally arranged diffusion vortex chamber and a longitudinally arranged oil-gas separator; or a box structure formed by a horizontally arranged diffusion vortex chamber and a horizontally arranged oil-gas separator; or a combined structure formed by the horizontally arranged diffusion vortex chamber and the longitudinally arranged oil-gas separator. Referring to FIGS. 1-13, the rest is identical to the Embodiment 1.

Embodiment 3

The present invention comprises an engine 21 of a vehicle and an air intake throttle 22. An energy saving device 20 for separating exhaust is provided between the engine 21 and the air intake throttle 22. The energy saving device 20 is a cylinder structure manufactured by an oil-gas separating technology and comprising a diffusion vortex chamber and a separation tube. According to an aerodynamic principle, the exhaust is compressed and performed with high speed vortex in the energy saving device 20 to improve separation degree, so as to separate engine oil vapor in the exhaust from combustible mixed gases for sending into the engine 21 via the air intake throttle 22. Referring to FIGS. 1-13, the rest is identical to the Embodiment 1.

Embodiment 4

A longitudinally arranged diffusion vortex chamber and a longitudinally arranged oil-gas separator adopt a cylinder structure, wherein the energy saving device 20 comprises an external shell 1, an air inlet pipe 10 and an air outlet pipe 11;

wherein the external shell 1 is a sealed cylinder shaped shell, the air inlet pipe 10 and the air outlet pipe 11 are provided on an up portion of the external shell 1;

wherein a first upper baffle 3 and a first lower baffle 5 are mounted in the external shell 1, the first upper baffle 3 and the first lower baffle 5 divide an internal chamber of the external shell 1 into an upper chamber 2, a middle chamber 4 and a lower chamber 7;

wherein the air inlet pipe 10 is hermetically matched with and respectively passes through a shell top plate 9, the first upper baffle 3 and the first lower baffle 5 to extend into the lower chamber 7, and an inlet-pipe bend 6 is provided on an end portion of the air inlet pipe 10;

wherein the air outlet pipe 11 is hermetically matched with and passes through the shell top plate 9 to communicate with the upper chamber 2;

wherein two tubes are provided in the middle chamber 4 which are respectively a primary separation tube 14 and a secondary separation tube 13, an upper portion of the primary separation tube 14 has a primary-separation-tube discharge hole 12 provided thereon, a lower portion of the primary separation tube 14 is communicated with the lower chamber 7, a lower portion of the secondary separation tube 13 has a secondary-separation-tube inlet hole 15, and an upper portion of the secondary separation tube 13 is communicated with the upper chamber 2. Referring to FIGS. 1-4, the rest is identical to the Embodiments mentioned above.

In the present invention, the air inlet pipe 10 and the air outlet pipe 11 are provided on the up portion of the external shell 1. The air inlet pipe 10 is connected with an exhaust pipe of a crankcase in the engine. The air outlet pipe 11 is communicated with a throttle of the engine. Crankcase exhaust in the engine enters the lower chamber 7 via the inlet-pipe bend 6 on the end portion of the air inlet pipe 10. A pipe opening of the inlet-pipe bend 6 faces slightly downward, and preferably leans on an internal wall on a side of the lower chamber. According to the aerodynamic principle, the exhaust is diffused in the lower chamber and forms vortex, i.e. the exhaust in the engine of the lower chamber is collected and compressed to form a natural vortex which is capable of improving separation degree while rotating at a high speed, in such a manner that waste oil in the exhaust is adhered on the internal wall of the lower chamber 7 and stays in the lower chamber 7, in such manner that the engine oil vapor in the exhaust is completely separated from combustible mixed gases. Since exhaust continually passes through the air inlet pipe 10, a certain pressure is formed in the lower chamber 7, in such a manner that the exhaust accesses into the primary separation tube 14 via the lower chamber 7, accesses into the middle chamber 4 via the primary-separation-tube discharge hole 12, and then accesses into the upper chamber 2 through the secondary separation tube 13 via the secondary-separation-tube inlet hole 15 on a low portion of the secondary separation tube 13. The waste oil in the exhaust is separated repeatedly by the primary separation tube 14, the middle chamber 4 and the secondary separation tube 13, in such a manner that the exhaust is cleaned to form clean highly combustible gas molecules, which are sent by the air outlet pipe 11 into the engine for combustion again via the throttle of the engine. Thus the combustion efficiency of the engine is effectively improved, and the engine is cleaned to a certain extent, so as to improve the service life of the engine effectively. The experimental results show that after using the present invention, in normal ignition circumstances, due to the increase in the combustible molecules, charging efficiency is greatly improved, and probability of the oxidation of the fuel is greatly improved. Thus the combustion efficiency is improved and an effect of fuel saving is achieved. Horsepower and torque of the engine are increased by 10%-20%, in such a manner that the vehicle starts faster and smoother, the accelerator reacts more responsively and impulsive forces during the process of running are increased apparently. Furthermore, a formation cycle of the carbon deposition on the throttle and sparking plug is prolonged effectively. In addition, emission values of NO, CO and HC of the exhaust are effectively decreased, and the discharged harmful gas is less. The present invention keeps the structure of the engine unchanged and is installed simply. The present invention is suitable for gasoline vehicle, diesel vehicle and etc., and has apparent effects. Referring to FIGS. 1-4, the rest is identical to the embodiments mentioned above.

Embodiment 5

The external shell 1 is in a cylinder shape, a shell-bottom plate 8 is concave downward and has an arc surface, a center of a bottom of the arc surface has a bottom-plate oil leaking hole 18, a bottom-plate oil drain pipe 19 is provided below the bottom-plate oil leaking hole 18, in such a manner that the waste oil stayed in the lower chamber is liable to be exported from the bottom-plate oil drain pipe 19 for recycling. Referring to FIGS. 1-4, the rest is identical to the embodiments mentioned above.

Embodiment 6

Preferably, the first lower baffle 5 is concave downward and has an arc surface, in such a manner that the waste oil adhered on a low portion of the first lower baffle 5 is liable to drip down, and the residual oil in the middle chamber is assembled towards a middle portion thereof. The center of a bottom of the arc surface has a lower-baffle oil leaking hole 16, so as to provide convenience for guiding the residual oil stayed in the middle chamber into the lower chamber via the lower-baffle oil leaking pipe 17 for recycling. Referring to FIGS. 1-4, the rest is identical to the embodiments mentioned above.

Embodiment 7

The shell top plate 9 is convex upward and has an arc surface, so as to facilitate discharging highly combustible gases from the air outlet pipe 11. Referring to FIGS. 1-4, the rest is identical to the embodiments mentioned above.

Embodiment 8

A lower-baffle oil leaking pipe 17 is provided below the lower-baffle oil leaking hole 16;

the shell top plate 9 is convex upward and has an arc surface;

the inlet-pipe bend 6 is bending outwardly at an angle of 90°, and an end portion of the inlet-pipe bend 6 has an inclined cutting;

the inclined cutting on the end portion of the inlet-pipe bend 6 faces slightly downward;

at least 3 separation-tube interlayers are sleeved in the separation tubes, and each separation-tube interlayer has at least 3 through holes which are in a shape of a square, a rhombus, a circle or a curve provided thereon; and the through holes provided on the separation-tube interlayer are arranged irregularly. Referring to FIGS. 1-4, the rest is identical to the embodiments mentioned above.

Embodiment 9

The inlet-pipe bend 6 is firstly manufactured at an angle of 90°, and then the inlet-pipe bend 6 is bended outwardly at an angle with a range of 20°-45° and preferably 35°. An end portion of the inlet-pipe bend 6 is an inclined cutting. The inclined cutting on the end portion of the inlet-pipe bend 6 preferably faces slightly downward, and an inclined angle is at a range of 0.5-20°. Referring to FIGS. 1-4, the rest is identical to the embodiments mentioned above.

Embodiment 10

At least 3 separation-tube interlayers are sleeved in the separation tubes, and each separation-tube interlayer has at least 3 through holes provided thereon. The through holes provided on the separation-tube interlayer are in a shape of a square, a rhombus, a circle or a curve, or in other regular or irregular shapes. Preferably, the through holes provided on the separation-tube interlayer are in small-square shapes which are irregularly arranged. The exhaust separated by the lower chamber accesses into the primary separation tube 14. In the upstanding primary separation tube 14, the holes in the small-square shapes is capable of absorbing and suspending engine oil vapor which is viscous, and releasing combustible molecules which are separated. The separated combustible molecules then access into the upstanding secondary separation tube to be suspended and separated again to access into the upper chamber. Referring to FIGS. 1-4, the rest is identical to the embodiments mentioned above.

Embodiment 11

An up opening of the secondary separation tube and an inlet of the air outlet pipe 11 are provided diagonally, so as to increase flowing resistance to separate the oil and gas molecules completely. Referring to FIGS. 1-4, the rest is identical to the embodiments mentioned above.

Embodiment 12

The applicant owns a 1.5 L gasoline car which has fuel consumption at a range of 6.3-6.5 L/100 km under normal circumstances. After modification, the device of the present invention is installed on the car. On a route of 136 kilometers in a round trip between Xiangtan and Changsha in China, the car runs on a highway at a speed of 100-110 km per hour without loosing accelerator. After testing, fuel consumption of the car is only 4.6 L/100 km. While running in the city in normal condition, the fuel consumption is only 4.7 L/100 km after testing and promotion of speed thereof is apparent. The condition of running is tested for 2100 km. If the price of the fuel is 7.97 RMB/L, the cost of fuel is 0.36 RMB/km on average. Now the present invention is continually tested on various cars and the effects are apparent.

Embodiment 13

An exclusive energy saving and emission reduction device for improving fuel efficiency of the vehicle provided by the present invention is a second cylinder structure formed by a longitudinally arranged diffusion vortex chamber and oil-gas separator, wherein the energy saving device 20 comprises a second cylinder 37, an air inlet pipe 10 and an air outlet joint 44;

wherein both ends of the second cylinder 37 are sealed, a second lower baffle 40 is hermetically provided on a middle portion inside the second cylinder 37, so as to separate the second cylinder 37 into a vortex chamber on a lower portion and a filter chamber on an upper portion;

wherein an air inlet hole is provided on the second cylinder 37 below the second lower baffle 40 and hermetically connected to the air inlet pipe 10, through holes for communicating the vortex chamber on the lower portion and the filter chamber on the upper portion; and wherein a filter module 38 is hermetically provided in the filter chamber on the upper portion above the second lower baffle 40 in the second cylinder 37, air through holes are respectively provided on an upper end and a lower end of the filter module 38, a lower air through hole of the filter module 38 matches with the through hole provided on the second lower baffle 40, the upper air through hole of the filter module 38 communicates with the filter chamber; an exhaust through hole is provided on an up portion or an external wall of the filter chamber, and connected to and matched with an air outlet joint 44.

Preferably, the second cylinder 37 is in a cylinder shape, a head cover 43 and a bottom cover 41 are respectively matched with and hermetically provided on two ends of the second cylinder 37, and a bottom-cover oil drain pipe joint 42 is provided on the bottom cover 41. Referring to FIGS. 5-8, the rest is identical to the embodiments mentioned above.

During working processes, an exhaust pipe of the crankcase is connected with the air inlet pipe 10. The exhaust enters the lower chamber via the air inlet pipe 10 provided on an external middle portion of the second cylinder 37, so as to be performed with oil-gas separation according to the aerodynamic principle. The separated exhaust passes through a center hole on the second lower baffle 40 and enters the filter module 38 provided on an internal middle portion of the second cylinder 37 to achieve re-filtering of oil and gas, in such a manner that hydrocarbon, fuel, and particles which are unburned in the exhaust, and byproduct of gases are separated from emissions of the crankcase. Combustible gas passes through an up portion of the filter module 38 and enters the air outlet joint 44 provided on the upper portion of the external wall of the second cylinder 37, and then enters the engine via the air intake throttle connected with the air outlet joint 44. New combustible gases are leaded to an air suction portion of the engine for further combustion, so as to achieve an effect of improving efficiency and saving energy. Oil sludge residue flows into the bottom-cover oil drain pipe joint 42 provided on the bottom cove 41 of the second cylinder 37 via the second lower baffle 40 on a low end of the filter module 38, in such a manner that the oil sludge is discharged. Referring to FIGS. 5-8, the rest is identical to the preferred embodiments mentioned above.

Embodiment 14

The bottom cover 41 is a convex structure or a concave structure facing downward and having an arc surface, in such a manner that oil sludge sewage is capable of automatically flowing to a bottom of the bottom cover 41.

The bottom-cover oil leaking hole 45 for matching with the bottom-cover oil drain pipe joint 42 is provided on the bottom of the bottom cover 41, so as to discharge the oil sludge sewage periodically or non-periodically. Referring to FIGS. 5-8, the rest is identical to the preferred embodiments mentioned above.

Embodiment 15

The filter module 38 is in a shape of a cuboid or a cylinder, and comprises a second filter shell 46 and a second filter screen 47, wherein the second filter shell 46 is in a shape of a cuboid or a cylinder, and the second filter screen 47 is provided inside the second filter shell 46, and wherein the second filter screen 47 comprises at least 3 layers having irregularly arranged through holes and baffles arranged in parallel.

Referring to FIGS. 5-8, the rest is identical to the embodiments mentioned above.

Preferably, the second filter screen 47 is folded on an entire screen to form at least 3 baffles arranged in parallel, i.e., folded into a plurality of U-shape bends, and each baffle has at least 3 through holes arranged irregularly. Preferably, small circular or square holes are provided irregularly on the second filter screen 47. Referring to FIGS. 5-8, the rest is identical to the embodiments mentioned above.

Preferably, a filter-module cover plate 48 matching with the second filter shell 46 is provided on any longitudinal side of the second filter shell 46, wherein the filter-module cover plate 48 is in a square shape or a circular shape.

Preferably, the filter-module cover plate 48 is provided at a top of the second filter shell 46 to separate and filter the exhaust. Referring to FIGS. 5-8, the rest is identical to the embodiments mentioned above.

Embodiment 16

A second upper baffle 39 is hermetically provided above the filter module 38 in the filter chamber, so as to form an exhaust chamber, a through hole for communicating a lower portion of the filter chamber with the exhaust chamber is provided on the second upper baffle 39, an exhaust through hole is provided on an up portion or an external wall of the exhaust chamber and matched with and connected to an air outlet joint 44. Referring to FIGS. 5-8, the rest is identical to the embodiments mentioned above.

Embodiment 17

The second upper baffle 39 has a round hole close to a periphery thereof, so as to allow separated combustible gases to pass through. The second lower baffle 40 is a downward concave having an arc surface, and a center of the arc surface has a round hole, so as to discharge filtered waste. Referring to FIGS. 5-8, the rest is identical to the embodiments mentioned above.

Embodiment 18

A middle portion of the air inlet pipe 10 is bended, so as to change direction of airflow. An opening of the air inlet pipe 10 entering the second cylinder 37 is an inclined cutting which is over 10°, the inclined cutting faces a wall of the second cylinder 37 downwardly, in such a manner that the exhaust discharged by crankcase is capable of forming a vortex while pumping, so as to improve the separation efficiency of oil and gas. Referring to FIGS. 5-8, the rest is identical to the embodiments mentioned above.

Embodiment 19

An exclusive energy saving and emission reduction device for improving fuel efficiency of the vehicle provided by the present invention is a combined structure formed by the horizontally arranged diffusion vortex chamber and the longitudinally arranged oil-gas separator, wherein the energy saving device 20 comprises an external shell, a heavy oil dirt separator 36 and a light oil dirt filter 24, wherein the heavy oil dirt separator 36 and the light oil dirt filter 24 are respectively provided on two sides of a chamber of the external shell, and an intermediate connection tube 23 is provided between the heavy oil dirt separator 36 and the light oil dirt filter 24;

through holes respectively matching with an air inlet pipe 10 and an air outlet pipe 11 are provided on two ends of the external shell, and a drain hole is provided on a low portion of the external shell;

a first end of the air inlet pipe 10 hermetically passes through the through hole of the external shell to be inclinedly inserted into the heavy oil dirt separator 36, and is closely adhered to an internal wall of the heavy oil dirt separator 36;

a drain outlet and a drain pipe matching with the drain outlet are provided on a bottom of the heavy oil dirt separator 36, the drain pipe passes through the drain hole provided on the low portion of the external shell and extends out of the external shell;

an air outlet connector is provided on an up portion of the heavy oil dirt separator 36, wherein the air outlet connector is connected with a first end of the intermediate connection tube 23, and a second end of the intermediate connection tube 23 is connected with an air inlet connector on a first end of the light oil dirt filter 24; and an air hole communicated with the chamber in the external shell is provided on a second end of the light oil dirt filter 24, and the air outlet pipe 11 is communicated with the chamber in the external shell.

During operation of the engine, oil gas discharged from the crankcase enters the heavy oil dirt separator 36 at a high speed via the air inlet pipe 10 to form a high-speed vortex and diffuse. Heavy impurities and relatively heavy oil gas are dripped onto an inner wall of the heavy oil dirt separator 36, and then flow towards a bottom of the heavy oil dirt separator 36. Relatively light oil gas passes through the air outlet connector on the up portion of the heavy oil dirt separator 36 and the intermediate connection tube 23, and then enters the light oil dirt filter 24 to be filtered to form new combustible gas. The new combustible gas passes through the through hole on the second side of the light oil dirt filter 24 to enter the chamber of the external shell, and finally is sent to the engine for further combustion via the air outlet pipe 11 communicated with the chamber of the external shell, so as to achieve effects of improving efficiency and saving energy. The present invention is capable of not only ensuring a pressure balance in the crankcase, but also decreasing air pollution caused by the oil gas in the crankcase. Oil sludge residue deposited on a bottom of the heavy oil dirt separator 36 can be discharged from the bottom of the heavy oil dirt separator 36 regularly. Referring to FIGS. 9-13, the rest is identical to the preferred embodiments mentioned above.

Embodiment 20

A height of a first side of the external shell having the heavy oil dirt separator 36 provided is greater than a second side thereof having the light oil dirt filter 24 provided, and an installation height of the light oil dirt filter 24 is greater than a height of a bottom of the heavy oil dirt separator 36, so as to facilitate a more smooth circular airflow. Referring to FIGS. 9-13, the rest is identical to the embodiments mentioned above.

Embodiment 21

Preferably, a baffle 25 is provided on an up portion of the light oil dirt filter 24, a folder block is provided on a first end of the baffle 25, the folder block has a through hole provided, contact portions between the baffle 25, the folder block and the chamber of the external shell are hermetically matched, in such a manner that an exhaust chamber is divided from the chamber of the external shell an exhaust chamber, and the air outlet pipe 11 is provided on a side of the exhaust chamber and communicated with the exhaust chamber. By isolating out the exhaust chamber, the route of gas circulation is increased to improve separation effects. Furthermore, the temperature is reduced as well. Referring to FIGS. 9-13, the rest is identical to the embodiments mentioned above.

Embodiment 22

26 Preferably, the external shell is formed by an upper shell 32 and a lower shell 33 which are hermetically matched, wherein the drain pipe provided on the bottom of the heavy oil dirt separator 36 passes through the drain hole provided on the low portion of the lower shell 33 and extends out of the lower shell 33. The external shell is produced into a segregated structure, so as to facilitate not only processing and installation, but also maintenance and cleaning. Referring to FIGS. 9-13, the rest is identical to the embodiments mentioned above.

Embodiment 23

Preferably, the heavy oil dirt separator 36 comprises an upper cover 26, a first cylinder 27 and a lower cover 28;

wherein an upper cover 26 is matched with and provided on an upper end of the first cylinder 27; a through hole matched with the air inlet pipe 10 is provided on an up portion of a wall of the first cylinder 27, the lower cover 28 is provided on a lower end of the first cylinder 27, wherein the lower cover 28 is an outwardly convex structure, a lower-cover oil leaking hole 34 is provided on a bottom of the lower cover 28, and a lower-cover oil drain pipe 35 matched with the lower-cover oil leaking hole 34 is provided below the lower-cover oil leaking hole 34. Referring to FIGS. 9-13, the rest is identical to the embodiments mentioned above.

Embodiment 24

Preferably, the lower cover 28 is in a shape of a dish comprising at least one boss, the lower cover 28 has a through hole matched with the drain hole provided on the low portion of the external shell, i.e., the lower cover 28 is hermetically matched with a low portion of the external shell, and the two through holes are overlapped.

Preferably, a lower-cover oil leaking hole 34 is provided on a low portion of the lower cover 28, and the lower-cover oil leaking hole 34 reaches out of the external shell through the lower-cover oil drain pipe 35 via an oil hole of the external shell.

Preferably, an oil hole is provided on a low portion of the lower cover 28, in such a manner that oil dirt deposition is capable of flowing into the lower cover 8, which facilitates cleaning and emission. Referring to FIGS. 9-13, the rest is identical to the embodiments mentioned above.

Embodiment 25

A filter layer is sleeved in the cylinder of the light oil dirt filter 24. The filter layer is bended into baffle in parallel or stagger distribution. Each baffle has at least 3 through holes arranged irregularly. The filter screen is formed by at least 3 layers of the baffles having irregularly arranged through holes. By sleeving the filter layer into the light oil dirt separator 24, filtration effect of oil gas is further improved. Referring to FIGS. 9-13, the rest is identical to the embodiments mentioned above.

Embodiment 26

Preferably, the light oil dirt filter 24 comprises a first filter shell 29 and a first filter screen 30;

wherein a periphery of the first filter screen 30 is hermetically matched with an internal wall of the first filter shell 29, the air inlet connector is provided on a first side of the first filter shell 29, the air hole communicated with the chamber of the external shell is provided on a second side of the first filter shell 29, the light oil dirt filter 24 is in a shape of a cuboid or a cylinder;

wherein the first filter screen 30 is folded on an entire screen to form into at least 3 baffles arranged in parallel or in a staggered form, and each baffle has at least 3 through holes arranged irregularly; the irregularly arranged through holes are for preventing the exhaust from passing through quickly, so as to decrease the flow rate of the exhaust and increase a route of the exhaust, in such a manner that the separation effect is improved. Alternatively, the first filter screen 30 is formed by at least 3 layers of baffles having irregularly arranged through holes. Referring to FIGS. 9-13, the rest is identical to the embodiments mentioned above.

Embodiment 27

Preferably, a cover plate 31 matched with the first filter shell 29 is provided on any longitudinal side of the first filter shell 29, wherein the cover plate 31 is in a circular or square shape, so as to facilitate not only processing and installation, but also maintenance and cleaning. Referring to FIGS. 9-13, the rest is identical to the embodiments mentioned above.

Embodiment 28

Preferably, at least 6 bumps are provided on the upper shell 32, so as to speed up thermal dissipation. Referring to FIGS. 9-13, the rest is identical to the embodiments mentioned above.

Embodiment 29

Preferably, a pipe opening on an end portion of the air inlet pipe 10 on which the air inlet pipe 10 is connected with the first cylinder 27 of the heavy oil dirt separator 36 is an inclined cutting of over 10°, so as to facilitate formation of vortex by the exhaust, so as to improve a separation effect. Referring to FIGS. 9-13, the rest is identical to the embodiments mentioned above.

Embodiment 30

Preferably, the intermediate connection tube 23 in the present invention is spliced together by 3 sections of pipes having a bend of 90°, and an integral structure is in a shape of S, which has effects of slowing down the airflow and decreasing carried impurities. Referring to FIGS. 9-13, the rest is identical to the embodiments mentioned above.

Embodiment 31

Preferably, a locating groove or a locating convex is provided on a periphery of the lower cover 28 and a corresponding position of the external shell. Specifically, the groove is provided on the periphery of the lower cover 28, and the locating convex is provided on the corresponding position of the external shell; or otherwise, the convex is provided on the periphery of the lower cover 28, and the locating groove is provided on the corresponding position of the external shell; so as to facilitate positioning for installing, in such a manner that installation is more convenient and precise. Referring to FIGS. 9-13, the rest is identical to the embodiments mentioned above.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for improving fuel efficiency of a vehicle, comprising steps of:
    installing an energy saving device (20) for separating exhaust between an engine (21) and an air intake throttle (22); and
    according to an aerodynamic principle, compressing the exhaust and performing high speed vortex on the exhaust in the energy saving device (20) to improve separation degree, so as to separate engine oil vapor in the exhaust from combustible mixed gases for sending into the engine (21) via the air intake throttle (22);
    wherein the energy saving device (20) is a sealed body manufactured by an oil-gas separating technology and comprising a diffusion vortex chamber and an oil-gas separator;
    wherein the energy saving device (20) is a cylindrical structure manufactured by an oil-gas separating technology and having a diffusion vortex chamber and a separating tube provided, wherein according to an aerodynamic principle, the exhaust is compressed and performed with high speed vortex in the energy saving device (20) to improve separation degree, so as to separate engine oil vapor in the exhaust from the combustible mixed gases for sending into the engine (21) via the air intake throttle (22).

2. The method for improving fuel efficiency of the vehicle, as recited in claim 1, wherein the energy saving device (20) is a cylinder structure formed by a longitudinally arranged diffusion vortex chamber and a longitudinally arranged oil-gas separator; or a box structure formed by a horizontally arranged diffusion vortex chamber and a horizontally arranged oil-gas separator; or a combined structure formed by the horizontally arranged diffusion vortex chamber and the longitudinally arranged oil-gas separator.

3. An exclusive energy saving and emission reduction device comprising an energy saving device (20) which comprises an external shell (1), an air inlet pipe (10) and an air outlet pipe (11);
    wherein the external shell (1) is a sealed cylinder shaped shell, the air inlet pipe (10) and the air outlet pipe (11) are provided on an up portion of the external shell (1);
    wherein a first upper baffle (3) and a first lower baffle (5) are mounted in the external shell (1), the first upper baffle (3) and the first lower baffle (5) divide an internal chamber of the external shell (1) into an upper chamber (2), a middle chamber (4) and a lower chamber (7);
    wherein the air inlet pipe (10) is hermetically matched with and respectively passes through a shell top plate (9), a first upper baffle (3) and a first lower baffle (5) to extend into the lower chamber (7), and an inlet-pipe bend (6) is provided on an end portion of the air inlet pipe (10);
    wherein the air outlet pipe (11) is hermetically matched with and passes through the shell top plate (9) to communicate with the upper chamber (2);
    wherein two tubes are provided in the middle chamber (4) which are respectively a primary separation tube (14) and a secondary separation tube (13), an upper portion of the primary separation tube (14) has a primary-separation-tube discharge hole (12) provided thereon, a lower portion of the primary separation tube (14) is communicated with the lower chamber (7), a lower portion of the secondary separation tube (13) has a secondary-separation-tube inlet hole (15), and an upper portion of the secondary separation tube (13) is communicated with the upper chamber (2).

4. The exclusive energy saving and emission reduction device, as recited in claim 3, wherein the external shell (1) is in a cylinder shape, a shell-bottom plate (8) is concave downward and has an arc surface, a center of a bottom of the arc surface has a bottom-plate oil leaking hole (18), a bottom-plate oil drain pipe (19) is provided below the bottom-plate oil leaking hole (18).

5. The exclusive energy saving and emission reduction device, as recited in claim 3, wherein the first lower baffle (5) is concave downward and has an arc surface, a center of a bottom of an arc surface has a lower-baffle oil leaking hole (16), a lower-baffle oil leaking pipe (17) is provided below the lower-baffle oil leaking hole (16).

6. The exclusive energy saving and emission reduction device, as recited in claim 3, wherein the shell top plate (9) is convex upward and has an arc surface.

7. The exclusive energy saving and emission reduction device, as recited in claim 3, wherein the inlet-pipe bend (6) is bending outwardly at an angle of 90°, and an end portion of the inlet-pipe bend (6) has an inclined cutting.

8. The exclusive energy saving and emission reduction device, as recited in claim 7, wherein the inclined cutting on the end portion of the inlet-pipe bend (6) faces slightly downward.

9. The exclusive energy saving and emission reduction device, as recited in claim 3, wherein at least 3 separation-tube interlayers are sleeved in the separation tube, and each separation-tube interlayer has at least 3 through holes provided thereon.

10. The exclusive energy saving and emission reduction device, as recited in claim 9, wherein the through holes provided on the separation-tube interlayer are in a shape of a square, a rhombus, a circle or a curve.

11. The exclusive energy saving and emission reduction device, as recited in claim 9, wherein the through holes provided on the separation-tube interlayer are arranged irregularly.

12. An exclusive energy saving and emission reduction device, as recited in claim 1, wherein the energy saving device (20) comprises a second cylinder (37), an air inlet pipe (10) and an air outlet joint (44);
    wherein both ends of the second cylinder (37) are sealed, a second lower baffle 40 is hermetically provided on a middle portion inside the second cylinder (37), so as to separate the second cylinder (37) into a vortex chamber on a lower portion and a filter chamber on an upper portion;

an air inlet hole is provided on the second cylinder (37) below the second lower baffle (40) for hermetically installing the air inlet pipe (10) to install hermetically, through holes for communicating the vortex chamber on the lower portion and the filter chamber on the upper portion are provided on the lower baffle 40; and a filter module (38) is hermetically provided in the filter chamber on the upper portion above the second lower baffle (40) in the second cylinder (37), air through holes are respectively provided on an upper end and a lower end of the filter module (38), a lower air through hole of the filter module (38) matches the through hole provided on the second lower baffle (40), the upper air through hole of the filter module (38) communicates with the filter chamber, an exhaust through hole is provided on an up portion or an external wall of the filter chamber to install an air outlet joint (44) for coupling is installed.

13. The exclusive energy saving and emission reduction device, as recited in claim 12, wherein the second cylinder (37) is in a cylinder shape; a head cover (43) and a bottom cover (41) are respectively hermetically provided on two ends of the second cylinder (37); and a bottom-cover oil drain pipe joint (42) is provided on the bottom cover (41).

14. The exclusive energy saving and emission reduction device, as recited in claim 12, wherein a second upper baffle (39) is hermetically provided above the filter module (38) in the filter chamber, so as to form an exhaust chamber, a through hole for communicating the exhaust chamber and the filter chamber is provided on the second upper baffle (39), an exhaust through hole is provided on an up portion or an external wall of the exhaust chamber to install an air outlet joint (44).

15. The exclusive energy saving and emission reduction device, as recited in claim 13, wherein the bottom cover (41) is an outwardly convex structure, and a bottom-cover oil leaking hole (45) and a correspondent bottom-cover oil drain pipe joint (42) are provided on a bottom of the bottom cover (41).

16. The exclusive energy saving and emission reduction device, as recited in claim 12, wherein the filter module (38) is in a shape of a cuboid or a cylinder and comprises a second filter shell (46) and a second filter screen (47), wherein the second filter shell (46) is in a shape of a cuboid or a cylinder, and the second filter screen (47) is provided inside the second filter shell (46), and wherein the second filter screen (47) comprises at least 3 layers having irregular arranged through holes and baffles arranged in parallel.

17. The exclusive energy saving and emission reduction device, as recited in claim 16, wherein the second filter screen (47) is folded on an entire screen to form into at least 3 baffles arranged in parallel, and each baffle has at least 3 through holes arranged irregularly.

18. The exclusive energy saving and emission reduction device, as recited in claim 16, wherein a filter-module cover plate (48) matching with the second filter shell (46) is provided on any longitudinal side of the second filter shell (46), wherein the filter-module cover plate (48) is in a square shape or a circular shape.

19. The exclusive energy saving and emission reduction device, as recited in claim 14, wherein the second upper baffle (39) has a round hole close to a periphery thereof, the second lower baffle (40) is a downward concave structure having an arc surface, and a center of the arc surface has a round hole.

20. The exclusive energy saving and emission reduction device, as recited in claim 12, wherein a middle portion of the air inlet pipe (10) is bended, an opening of the air inlet pipe (10) entering the second cylinder (37) has an inclined cutting which is over 10°, the inclined cutting faces a wall of the second cylinder (37) slightly downwardly.

21. An exclusive energy saving and emission reduction device for the method, as recited in claim 1, wherein the energy saving device (20) comprises an external shell, a heavy oil dirt separator (36) and a light oil dirt filter (24), wherein the heavy oil dirt separator (36) and the light oil dirt filter (24) are respectively provided on two sides of a chamber of the external shell, and an intermediate connection tube (23) is provided between the heavy oil dirt separator (36) and the light oil dirt filter (24);

through holes respectively matching with an air inlet pipe (10) and an air outlet pipe (11) are provided on two ends of the external shell, and a drain hole is provided on a low portion of the external shell;

a first end of the air inlet pipe (10) hermetically passes through the through hole of the external shell to be inclinedly inserted into the heavy oil dirt separator (36), and is closely adhered to an internal wall of the heavy oil dirt separator (36);

a drain outlet and a drain pipe matching with the drain outlet are provided on a bottom of the heavy oil dirt separator (36), the drain pipe passes through the drain hole provided on the low portion of the external shell and extends out of the external shell;

an air outlet connector is provided on an up portion of the heavy oil dirt separator (36), wherein the air outlet connector is connected with a first end of the intermediate connection tube (23), and a second end of the intermediate connection tube (23) is connected with an air inlet connector on a first end of the light oil dirt filter (24); and an air hole communicated with the chamber in the external shell is provided on a second end of the light oil dirt filter (24), and the air outlet pipe (11) is communicated with the chamber in the external shell.

22. The exclusive energy saving and emission reduction device, as recited in claim 21, wherein a height of a first side of the external shell having the heavy oil dirt separator (36) provided is greater than a second side thereof having the light oil dirt filter (24) provided, and an installation height of the light oil dirt filter (24) is greater than a height of a bottom of the heavy oil dirt separator (36).

23. The exclusive energy saving and emission reduction device, as recited in claim 21, wherein a baffle (25) is provided on an up portion of the light oil dirt filter (24), a folder block is provided on a first end of the baffle (25), the folder block has a through hole provided, contact portions between the baffle (25), the folder block and the chamber of the external shell are hermetically matched, in such a manner that an exhaust chamber is divided from the chamber of the external shell, and the air outlet pipe (11) is provided on a side of the exhaust chamber and communicated with the exhaust chamber.

24. The exclusive energy saving and emission reduction device, as recited in claim 21, wherein the external shell is formed by an upper shell (32) and a lower shell (33) which are hermetically matched, wherein the drain pipe provided on the bottom of the heavy oil dirt separator (36) passes through the drain hole provided on the low portion of the lower shell (33) and extends out of the lower shell (33).

25. The exclusive energy saving and emission reduction device, as recited in claim 21, wherein the heavy oil dirt separator (36) comprises an upper cover (26), a first cylinder (27) and a lower cover (28);
    wherein the upper cover (26) is matched with and provided on an upper end of the first cylinder (27); a through hole matched with the air inlet pipe (10) is provided on an up portion of a wall of the first cylinder (27), the lower cover (28) is provided on a lower end of the first cylinder (27),
    wherein the lower cover (28) is an outwardly convex structure, a lower-cover oil leaking hole (34) is provided on a bottom of the lower cover (28), and a lower-cover oil drain pipe (35) matched with the lower-cover oil leaking hole (34) is provided below the lower-cover oil leaking hole (34).

26. The exclusive energy saving and emission reduction device, as recited in claim 25, wherein the lower cover (28) is in a shape of a dish comprising at least one boss, the lower cover (28) has a through hole matched with the drain hole provided on the low portion of the external shell, or an oil hole communicated with the chamber of the external shell is provided on a low portion of the lower cover (28).

27. The exclusive energy saving and emission reduction device, as recited in claim 21, wherein the light oil dirt filter (24) comprises a first filter shell (29) and a first filter screen (30);
    wherein a periphery of the first filter screen (30) is hermetically matched with an internal wall of the first filter shell (29), the air inlet connector is provided on a first side of the first filter shell (29), an air hole communicated with the chamber of the external shell is provided on a second side of the first filter shell (29);
    wherein the first filter screen (30) is folded on an entire screen to form into at least 3 baffles arranged in parallel or in a staggered form, and each baffle has at least 3 through holes arranged irregularly. Alternatively, the first filter screen (30) is formed by at least 3 layers of baffles having irregularly arranged through holes.

28. The exclusive energy saving and emission reduction device for the method, as recited in claim 27, wherein a cover plate (31) matched with the first filter shell (29) is provided on any longitudinal side of the first filter shell (29), wherein the cover plate (31) is in a circular or square shape.

29. The exclusive energy saving and emission reduction device, as recited in claim 21, wherein at least 6 bumps are provided on the upper shell (32); and a pipe opening on an end portion of the air inlet pipe (10) on which the air inlet pipe (10) is connected with the first cylinder (27) of the heavy oil dirt separator (36) is an inclined cutting having an angle of over 10°.

* * * * *